United States Patent [19]
Begis

[11] Patent Number: 6,106,395
[45] Date of Patent: Aug. 22, 2000

[54] ADAPTIVE GAMING BEHAVIOR BASED ON PLAYER PROFILING

[75] Inventor: Glenn Begis, Hillsboro, Oreg.

[73] Assignee: Intel Corporation, Santa Clara, Calif.

[21] Appl. No.: 08/811,272

[22] Filed: Mar. 4, 1997

[51] Int. Cl.[7] .................................................. A63F 9/24
[52] U.S. Cl. .............................................................. 463/23
[58] Field of Search ................................ 463/27, 7, 8, 4, 463/2, 1, 31, 43, 44, 40

[56] References Cited

U.S. PATENT DOCUMENTS

| | | | |
|---|---|---|---|
| 4,521,014 | 6/1985 | Sitrick | 463/40 X |
| 4,657,247 | 4/1987 | Okada | 463/23 |
| 4,685,677 | 8/1987 | Demar et al. | 463/23 |
| 4,710,873 | 12/1987 | Breslow et al. | 463/31 |
| 4,858,930 | 8/1989 | Sato | 463/23 |
| 5,001,632 | 3/1991 | Hall-Tipping | 463/23 X |
| 5,553,864 | 9/1996 | Sitrick | 463/31 |
| 5,580,308 | 12/1996 | Nakamura | 461/1 X |
| 5,720,663 | 2/1998 | Nakatani et al. | 463/23 |
| 5,830,067 | 11/1998 | Graves et al. | 463/40 |

FOREIGN PATENT DOCUMENTS

| | | |
|---|---|---|
| 2163929 | 3/1986 | United Kingdom . |
| 9832507 | 7/1998 | WIPO . |

*Primary Examiner*—M. Sager
*Attorney, Agent, or Firm*—Blakely, Sokoloff, Taylor & Zafman LLP

[57] ABSTRACT

A method of adaptive computer game play based on profiling. A set of important characteistics are defined for a game. The data relating to the important characteristics is accumulated during game play based on a defined granularity to which each important characteristic should be kept. A player profile reflecting the important characteristics kept to the defined granularity is derived. The player profile may be used to affect subsequent game play as, for example, a proxy for the creating player.

16 Claims, 7 Drawing Sheets

|  | MISS | KILL | WOUND | | |
|---|---|---|---|---|---|
| LONG RANGE ACCURACY | 45% | 5% | 50% | | |
| CLOSE RANGE ACCURACY | 35% | 8% | 57% | | |
| RESPONSE TIME | <200 MSEC | <200 MSEC >300 MSEC | <300 MSEC >400 MSEC | <400 MSEC >500 MSEC | >500 MSEC |
| | 18% | 38% | 33% | 9% | 2% |

Fig. 3

ADAPTIVE GAMING BEHAVIOR BASED ON PLAYER PROFILING

BACKGROUND OF THE INVENTION (1) Field of the Invention

The invention relates to computer gaming. More specifically, the invention relates to the collection of metrics reflecting a player's abilities in regard to key gaming attributes, the assemblage of these metrics into a player profile which is available as an output of a game session, and the use of player profiles as an influencing mechanism in future game sessions.

(2) Related Art

Most computer game behavior can be viewed conceptually as a series of vectors. Each game vector represents one of a number of possible ways the game could function at that particular point in the game. From the software developer's perspective game behavior can be viewed as the path that the code will take at that point (ex. jump to a particular sub-routine vs. not jump, or setting a variable to one of many possible values). From the player's perspective game behavior can be viewed as the environmental and situational context the game presents at a given point in the game. In this sense game behavior embodies the level of challenge presented by the environment and a player's virual opponents.

All games possess characteristics which correlate to specific skills that are particularly important for a player to possess for success in the game. Such characteristics will vary from game to game. As an example, in a tank warfare game, possible important characteristics might be reaction time, accuracy (at different ranges), and resource (e.g., ammo) conservation.

FIG. 1 is a conceptual model of prior art game behavior. Each vector 2 in the series that models game behavior has a number of contributing components, including underlying constraints 5, random factors 6, and player interaction 7. Underlying constraints 5 are explicitly or implicitly fixed by the construction of the game program and user configuration. For example, the player may be able to configure the game to provide low, medium, or high levels of challenge. The underlying constraints 5 could also include the game's ability to present a greater or lesser challenge as the player proceeds through various levels of the game or in response to the players success at the game independent of, or in conjunction with explicit user configuration.

Random factors 6 are elements solely based on randomness which contribute to game behavior by impacting the game's interaction with a player. Random factors 6 are explicitly and will cause the me to behave differently during different ins ons of the game, independent of other factor Random factors 6 determine the relative importance of each of the important characteristics during any particular insintation of the game.

Player interaction 7 are inputs received during game play from the player which effect game behavior.

Underlying constraints 5 typically mandate a staring point from which the first vector in the series begins. From the initial vector, the tail 4 of each successive vector 2 in a series is the head 3 of the preceding vector 2. The head 3 of each vector can be thought of as an inflection point 8. At each inflection point 8, more than one possible vector 2 may result. The composite of the underlying constraints 5, player interaction 7, and random factors 6 dictate the direction and magnitude of each subsequent vector 2.

Underlying constants 5, random factors, 6 and player interaction 7 are all elements that exert influence upon the direction of the next vector 2 at each inflection point 8. As a simple example, in a labyrinth type game, a player may encounter a T-intersection which allows the player to proceed to the right or left The encounter with the T-intersection could be solely based on underlying constraints (upon reaching that point in the game the T-intersection will invariably be there). The encounter with the T-intersection could be solely based on random factors (sometimes the T-intersection will be there, and sometimes it won't be, based on a purely random software function). The encounter with the T-intersection could be solely based on player interaction (The T-intersection will be there if the player successfully completed a prior challenge in a given amount of time). The encounter with the T-intersection could be based on a combination of two or three of the elements (Upon reaching that point in the game the T-intersection will invariably be there, but at random times there will be a helpful game object made available at the intersection, if the player successfully completed a prior challenge in a given amount of time).

With this model in mind, computer gaming typically occurs in one of two modes: 1) player vs. computer, and 2) player vs. player(s). Many players regard player vs. player(s) or head-to-head competition as more fun and more interesting. In the player vs. player(s) mode, the player interaction component of each vector has multiple constituents: one for the first player and one for each additional player. This results in a more pleasurable gaming experience as it provides the players with a personal interaction element not available when competing against the computer. The desirability of a personal interaction element is based on the psychological principles of identity and ego. In general it is a better gaming experience if participants play the game together, instead of just playing a synchronously and comparing scores.

However there are several factors that can make head-to-head gaming difficult and can detract from the experience. Sufficient communication bandwidth to provide head-to-head game players with real-time response may not always be available due to excessive bandwidth requirements for a particular game, or due to a Communication Service Provider's inability to provide even a modest amount of bandwidth at any particular time. Personal scheduling constraints often prevent two or more players from competing in a head-to-head manner. Additionally, it is often difficult to find players who are sufficiently evenly matched for the game to be of peal enjoyment for all players. Moreover, large scale head-to-head tournaments are very difficult to orchestrate because of the logistics required to coordinate such a tournament. Thus, while playing against the computer is generally inferior to head-to-head gaming, it does allow a player to play when the above-mentioned factors prevent or diminish head-to-head competition.

When playing solo against the computer, many games permit the user to specify a level of their opponent such as 1) beginner, 2) intermediate, or 3) advanced which may provide for a better match than head-to-head competition between two poorly matched players. Additionally, some games, particularly, chess, have been developed where the game actually learns from its mistakes and becomes better and better through subsequent matches. Even so, playing the computer may fail to provide as robust a gaming experience with the personal interactive element that many players desire.

In view of the foregoing, it would be desirable to be able to enhance the solo gaming experience with the same personal interaction elements provided by head-to-head gaming when head-to-head competition is difficult or not possible. It would also be desirable if a system for accessing the skills of other players towards the end of determining potential suitable gaming partners was available. It would also be desirable if a meaningful handicapping mechanism which leveled the advantages one player may have over another player could be applied to head-to-head games. It would also be desirable to provide a system which would provide the foundation for large scale tournaments whose outcomes were dependent upon permutations of actual skills against random game instantiations but did not impose the logistical constraints of a head-to-head tournament.

BRIEF SUMMARY OF THE INVENTION

A method of adaptive game play based on profiling is disclosed. A set of important characterics are defined for a game. The data relating to the important characteristics is accumulated during game play based on a defined granularity to which each important characteristic should be kept A player poil reflecting the important characeristics kept to the defined granularity is derived. The player profile may be used to affect subsequent game play as, for example, a proxy for the creating player.

BRIEF DESCRIPTION OF THE DRAWINGS

FIG. 3 is an example of tabulation of statist of an exemplary portion of a player profile of one embodiment of the invention.

DETAILED DESCRIPTION OF THE INVENTION

Figure 2:
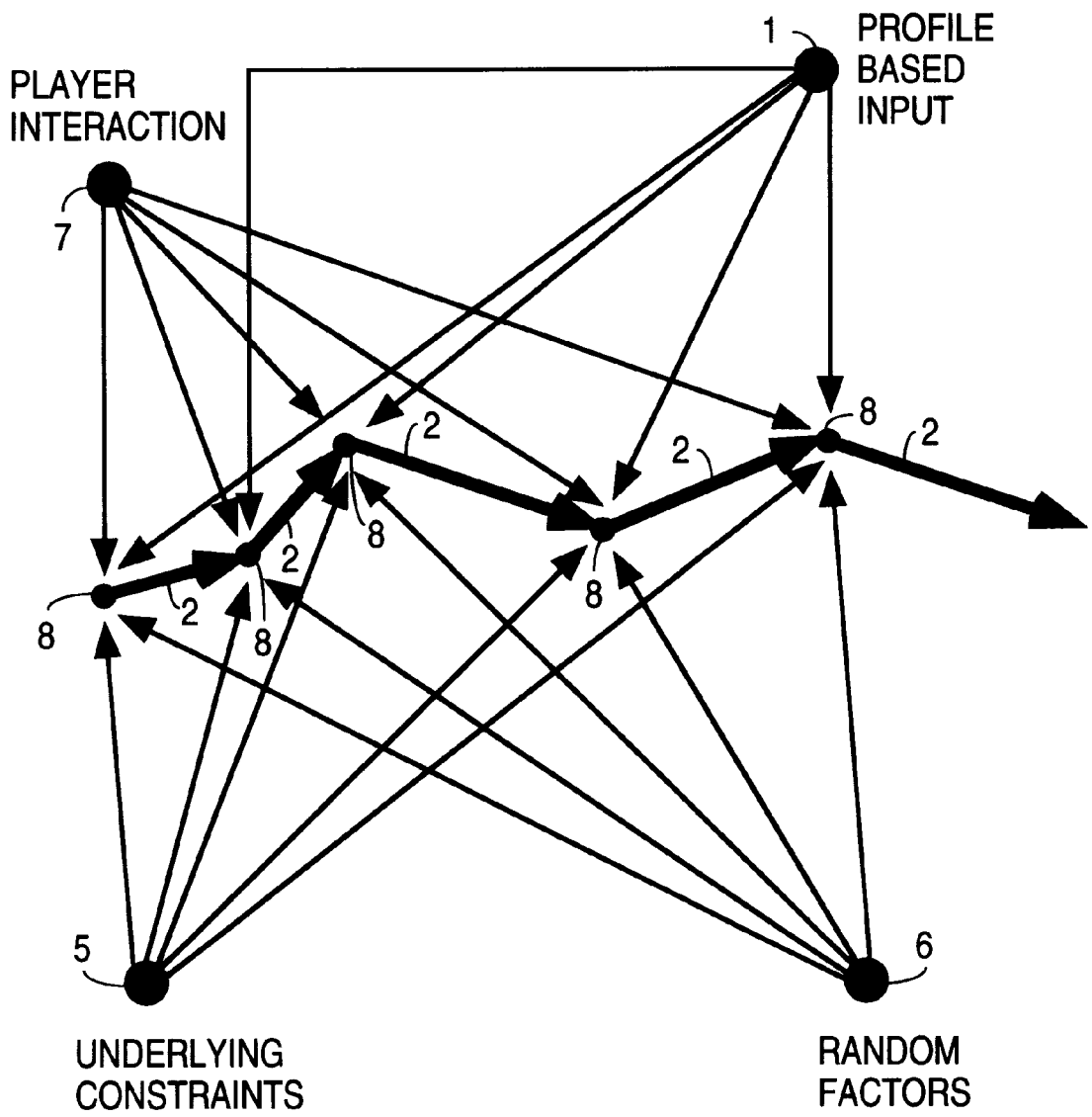
FIG. 2 is a conceptual model of game behavior in one embodiment of the invention.

FIG. 2 shows a conceptual model of game behavior in one embodiment of the invention. In this embodiment, four components contribute at inflection point 8 to the magnitude and direction of the corresponding vector 2. From a software developer perspective direction is flow through code, while magnitude corresponds to the value of variables. These components are underlying constraints 5, random factors 6, player interaction 7, and profile based inputs 1. The profile based inputs come from one or more player profiles (PPs). The way profile based input affects game behavior at inflection points 8 is discussed further below.

In one embodiment, a PP is a composite of metrics measuring important characteristics which may also be termed key gaming attributes. To create a PP, important characteristics which compose the PP are defined. These characteristics are derived from the player interaction during the session in which the PP is created. In addition to defining the important characteristics, the granularity to which those characteristics will be identified and maintained in the PP is also defined. For example, if an important char is accuracy with a handgun, it may well make sense and certainly makes the PP more robust if metrics of accuracy are kept at different ranges. This may result in categories such as short, intermediate, and long range, or even greater granularity, e.g., one meter increments out to some maximum range.

As a second example, if response time is defined to be an important characteristic, its importance likely varies between an inflection point which constitutes merely a decision on direction at an intersection and a combat related inflection point. Thus, combat response time may be kept to some granularity, while response time to non-combat inflection points may be ignored entirely or kept as a separate characteristic with its own granularity. Clearly, the more characteristics kept and the greater the granularity, the more storage space required to store the PP and the more computation power required to accumulate the data from which the metrics are derived. But more detailed PPs lead to a better gaming experience, particularly when the PP is used as a proxy opponent as discussed below.

While FIG. 2 shows only five vectors 2 and five inflection points 8, it is merely illustrative and is not meant to imply that a game will have merely five inflection points 8. Rather, it is contemplated that a typical game session will have a large number of inflection points from which statistically significant information can be drawn to create a PP and upon which a PP may exert an influence. It will be readily understood by one of ordinary skill in the art that too small a sample size, e.g., too few inflection points, may not yield a statistically relevant profile, the profile created from a small sample size may be determined to be artificially proficient in one or more characteristics and/or artificially deficient in one or more characteristics. Larger sample sizes reduce the risk and effect of outliers, possibly even permitting outlying samples to be eliminated in the derivation of the PP from the raw data. Existing programming techniques can be employed to capture the necessary raw data as well as perform any desired statistical manipulation. There may be methods of profiling that do not require a statistical treatment. For instance, in a labyrinth type game the player could have been presented with certain clues before encountering a junction that would let them know whether they should turn right or left Profiling could keep track of the players success of detecting different classes of clues. This data would effect subsequent PP based interaction with the game, but would not be dependent upon a statistical approach.

FIG. 3 is a tabulation of statistics of an exemplary portion of a PP. For the game to which the profile of FIG. 3 applies long range accuracy, close range accuracy and combat response time have been defined to be important characteristics. During a game session, the system, or node on which the game is being played, accumulates raw data which can be concurrently converted into the metrics of each important characteristic or can be maintained as raw data and converted to the metric in mass at the end of the game session. Mass conversion permits better statistical manipulation, but requires more storage space than updates of the metric in response to each incoming piece of raw data.

For example, as to accuracy, the metric is the percent of shots that hit (subdivided into wounds and kills). The granularity could be expanded by, for example, adjustment for target size or specific placement of hits on the target (e.g., shot/hit an arm). As shown in FIG. 3, the PP has a 55% hit rate in long range shoot-outs and a 68% hit rate in close range encounters. In response time, the metric is milliseconds before a response occurs. After a significant number of events, a statistical likelihood of a response occurring in each defined granule can be derived.

Response time, shown in FIG. 3, is particularly illusive of the importance of choosing proper granularity. If granularity instead of being chosen to be 100 millisecond increments was set at half second increments, well over 90% of all responses within this profile would occur in the first half second. Assuming this profile is representative of a typical player, such granularity would fail to provide any meaningful distinction as to response time between most players. It can also be seen that further division of the 200 or 300 millisecond and the 300–400 millisecond range might be made to provide an improved distribution as to different PPs. Moreover, there may also be a correlation between two important characteristics. For example, faster response time may reduce accuracy. Therefore, in one embodiment, part of deriving the PP might be defining functional relationships between correlated characteristics. As mentioned above, greater granularity will, of course, require additional storage capacity to maintain and may increase processor load during game play, though it will ultimately provide a more robust, enjoyable, profile based play experience.

While in the first exemplary embodiment, PPs were generated exclusively through actual play of the game. In an alternative embodiment where time constraints may be undesirable or impossible to generate a statistically significant PP through play, a PP may be generated in a highlight reel facsimile of the game. The highlight reel facsimile of the game clusters a very large number of inflection points into a highly condensed timeframe to permit the player to generate a large amount of data relevant to the important characteristics in a short time frame. Like a highlight reel of a football game, the action from a multi-hour game session may be condensed to only a few minutes.

It is envisioned that profile based input 1 in FIG. 2 may take any of several forms. The PP may be used as a proxy for the player that created it. This allows simulated head-to-head competition with a proxy (virual) opponent with skills similar to the player creating the PP. A first player may even play against a proxy of itself by playing against a self-created PP. While still not quite the same as head-to-head competition, it is envisioned that playing against a PP as a proxy for "real" person will yield an improved gaming experience over simply playing solo against the computer.

Additionally, playing against the PP may permit a player to identify good candidates for head-to-head match-ups without having to overcome real life scheduling conflicts for a test match. For example, if a first player plays against a PP of a second player and finds the match-up satisfactory, the user only then may establish contact with a second player who created the profile to schedule a head-to-head match. Conversely, if the second player's PP is not a satisfactory opponent, the PP may be discarded without making contact with its creator. PPs may be sold/supplied on disks or over the Internet allowing a player to acquire a broad selection of virtual opponents. This might be particularly valuable in the context of celebrity profiles. For purposes of integrity, the profiles should model the celebrity's game skills, e.g., be generated in the usual way not merely representing the qualities a programmer attributes to the celebrity.

An alternative use for PPs is to handicap players, thereby making not so equally matched players more equally matched. For example, if a first player is a much superior shot, e.g., much better accuracy, they may be handicapped by a slower weapon, less ammunition, or requiring fewer hits to kill. Other handicapping is, of course, possible and within the scope and contemplation of the invention. This handicapping function is useful even where the players are not competing directly, but rather, are competing, for example, for a score. A player with a superior PP may face tougher opponents or be granted fewer points for overcoming the same opponents.

Figure 1:
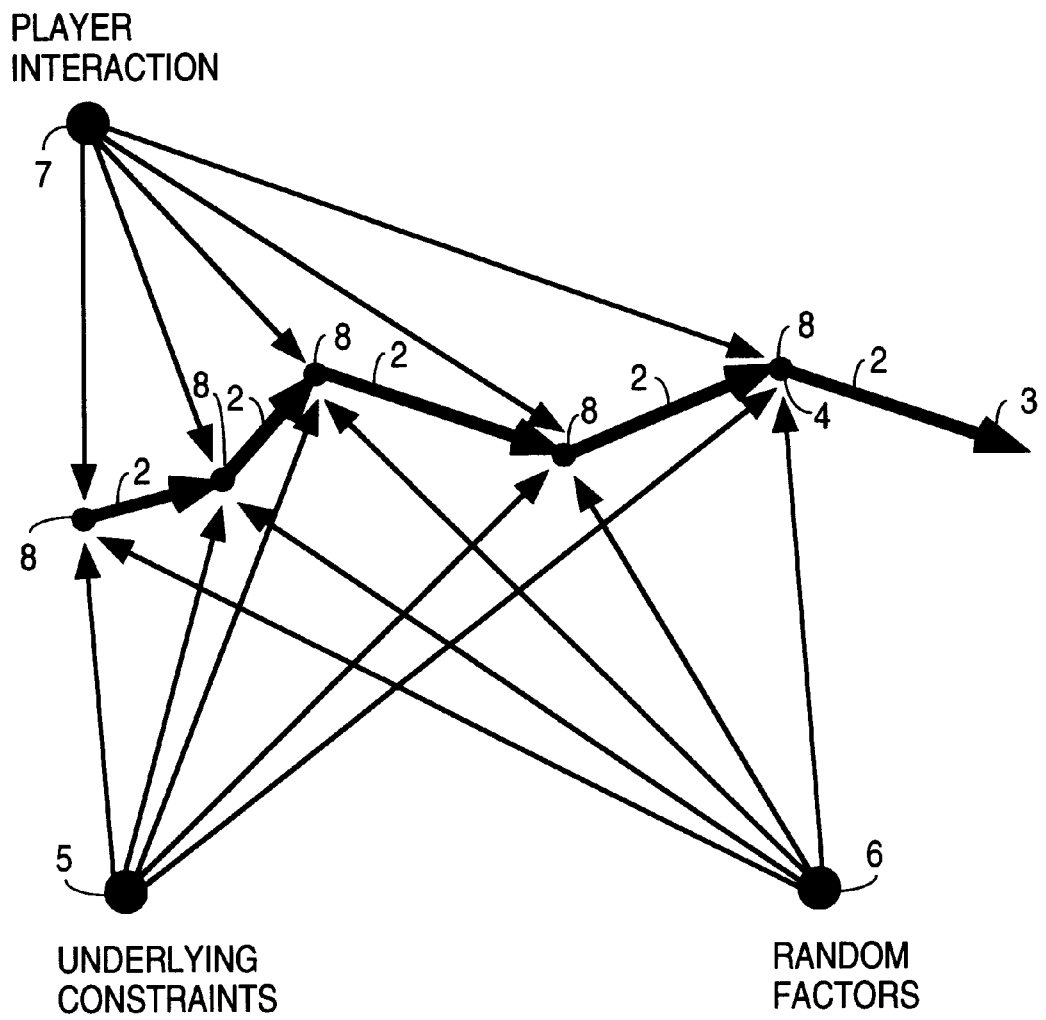
FIG. 1 is a conceptual model of prior art game behavior.
Figure 4:
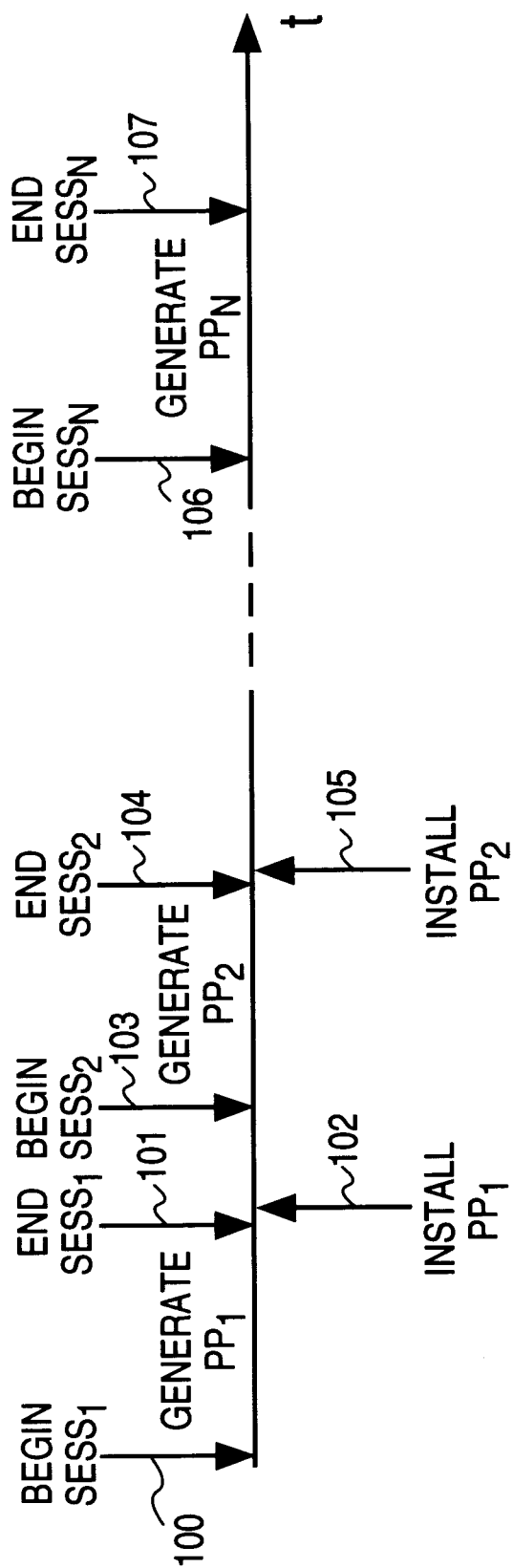
FIG. 4 is a timeline of recursive profile generation.

In the discussion above, PPs are generated during play against the computer in default mode which differs little from FIG. 1 with the prior art other than that data from which the profile is ultimately derived will be accumulated in the course of play during one or more game sessions. It is also envisioned and intended that profiles could be created either during head-to-head play or play against a profile. FIG. 4 shows a timeline of recursive profile generation. At point 100, the first game session begins. The game session ends at point 101. Between points 100 and 101, $PP_1$ is generated. At point 102, $PP_1$ is installed as a contributor to the vectors in the game model. For the remainder of this discussion, it will be assumed that the installation of a PP is as a proxy opponent However, one of ordinary skill in the art will recognize that the recursive generation can equally be applied to other types of PP input. A second game session begins at point 103 and continues through point 104 during which a $PP_2$ is During the generation of $PP_2$, $PP_1$ acts as a proxy opponent. Here, the generated $P_{P2}$ may be either generated from a blink slate or be a composite of the pre-existing $PP_1$ assimilated with new important characteristic data from the second game session delineated by time points 103 and 104. At the time point 105, $PP_2$ is installed as a proxy opponent, and the process continues through N-sessions where the Nth session is delineated by time points 106 and 107.

Figure 5:
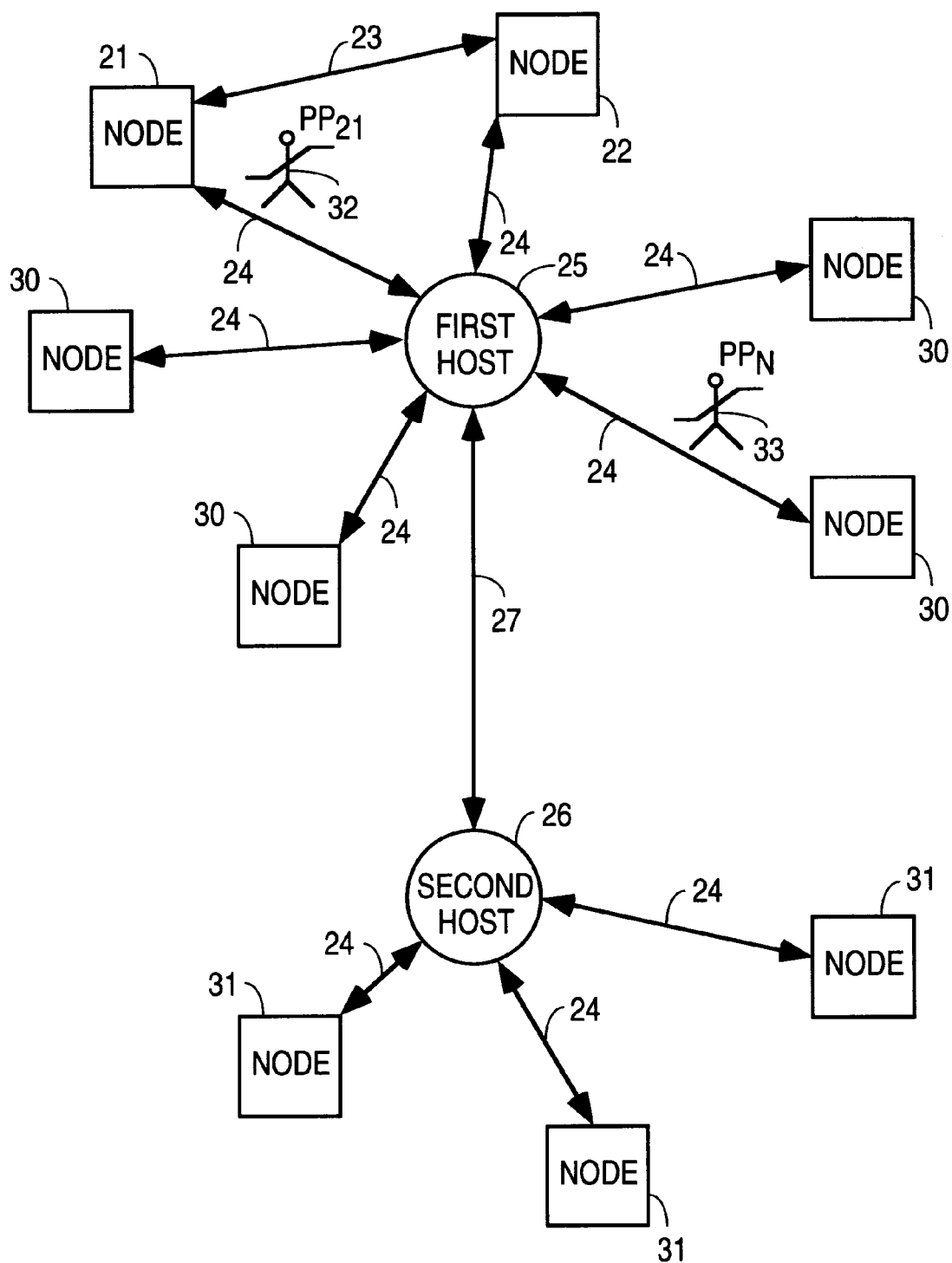
FIG. 5 is a block diagram of a system organization which, in addition to providing ready transferability of player profiles, also facilitates other profile related operations which are independent of both players.

It is important that PP be readily exchangeable between players so as to have opponents independent of time constraints and scheduling differences associated with real life. FIG. 5 shows a system organization which, in addition to providing ready transferability of PPs, also facilitates other profile related open which are independent of both players (examples are discussed below). The first node 21 and second node 22 are coupled locally by local link 23. Nodes 21, 22, 30 are also linked to either first host 25 or second host 26 via links 24. Nodes 21, 22, 30 may be personal computers, work stations, or any other suitable networkable game station. In one exemplary embodiment, first host 25 and second host 26 are servers on the Internet. First host 25 is linked to second host 26 by host-to-host link 27. In the event that nodes 31 wish to access the first host 25, they must do it through the second host 26 via the host-to-host link 27.

Two hosts and an arbitrary plurality of nodes have been shown in FIG. 5, however, any number of hosts and nodes are within the scope and contemplation of the invention. Moreover, first host 25 and its associated nodes 21, 22, 30 may constitute a local area network (LAN). The overall system shown in FIG. 5 may constitute any kind of network and need not be the Internet, nor is any particular transfer protocol mandated by the invention. At the simplest level, PPs may be exchanged between node by simply handing a disk on which the PP has been stored to another user. The user may then install the profile on that user's local node from the disk. It is tier envisioned that profiles may be distributed as attachments to e-mail or any similar system.

In one exemplary embodiment, a PP is created on node 21. Node 21 and the other nodes 22,30 associated with first host 25 are given sufficient rights to permit them to upload profiles to the first host 25. Conversely, nodes 31 may only be able to upload to host 26. First host 25 then acts as a library of PPs which may be catalogued by age group, skill level, or some other objective criteria. These profiles may en be accessed by any node with access rights to first host 25, either directly or indirectly, and with or without charge at the discretion of the host's owner. A listing of available downloadable PPs may be shown on a web page maintained by the host From a player prospective, it may be desirable not to know the precise metric of a PP's important characteristics as such could influence the strategy taken in attempting to defeat the PP in its role as a proxy opponent In another embodiment, the profiles may be computationally played against each other on, for example, the first host or a related host either in a tournament format or in an effort to find a suitable profile and/or real opponent for either proxy or head-to-head competition.

Figure 6:
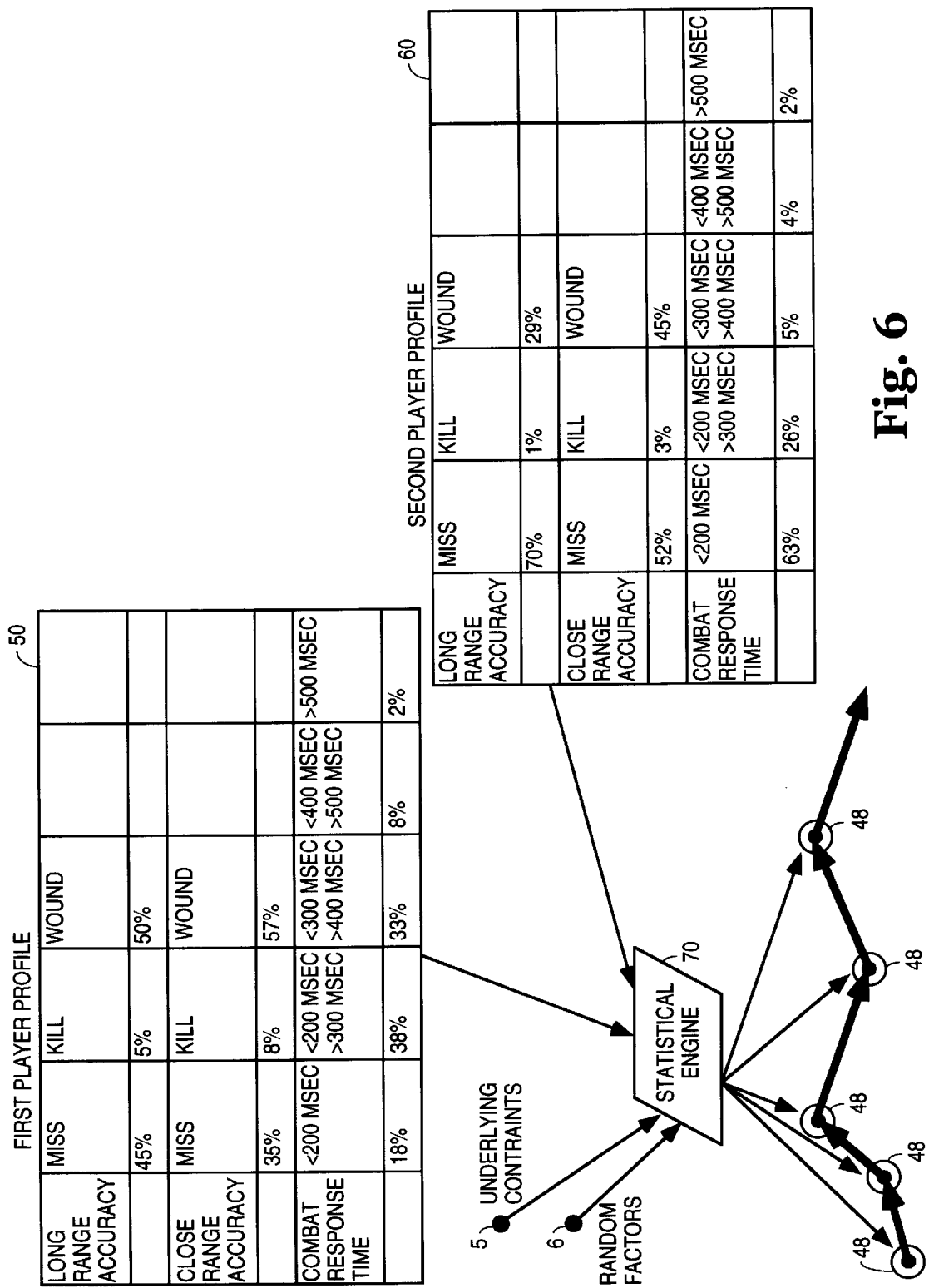
FIG. 6 is a conceptual model of a profile enabled pseudo-game of the invention.

FIG. 6 is a conceptual model of a profile enabled pseudo-game of the invention. In a pseudo-game, two or more PPs compete against each other independent of the players that created them. The competition occurs in a context which may be different than the context of the game which involves human input, for example there would be no need for graphical or audio output. Thus, the pseudo-game may be implemented in a wholly separate coding from the underlying game. In FIG. 6, first PP 50 competes against second PP 60 in a pseudo-game. At each inflection point 48 in the pseudo-game, underlying constraints 5, random factors 6, and relevant metrics from first PP 50 and second PP 60 are fed into statistical engine 70 which resolves profiled metrics constituents of the inflection point and continues a pseudo-game until a final resolution is reached. In view of the fact that there are no human players in the pseudo-game, it does not suffer the real time constraints of a regular game and need not provide the graphical presentation requisite in most popular games. However, it should maintain enough resemblance to the real game that outcomes of the pseudo-game which employ profiles of sufficient quality are consistent with outcomes had the game been played in full format or had the game been played head-to-head by the human players from whose interaction with the game the profiles were created. Of course, playing profiles against each other in partially abridged or full format is within the scope and contemplation of the invention.

The value of playing one profile against another profile is evident in two cases. In the first case, a player attaches or associates the player's PP to a free running avatar-robot-agent ("avatar") 32 which (referring to FIG. 5) traverses link 24 to first host 25. At first host 25, the avatar 32 may seek out other avatars 33 with PPs from identical games to pit its attached PPs against in a pseudo-game. The avatars 32, 33 may include a set of criteria that may be applied to the output of a pseudo-game, or are applied to the profile itself that are used to determine if the profiled owner of the other proxy would constitute a worthy opponent in actual head-to-head play. Alternatively, the avatars 32, 33 can merely make a note of which opponents might be worthy so that the player can download corresponding profiles for proxy play at the player's convenience. This system avoids wasting either player's time when the match is clearly unsuitable. Moreover, if the avatar fails to find a suitable opponent on first host 25, it may traverse the host-to-host link 27 and search second host 26 for a suitable opponent among the players without uploading rights to first host 25 (or player with rights which only uploaded to second host 26). In this manner, a large number of PPs may be screened without impacting the seeking player's game experience.

In the second case, a sponsor (possibly a vendor or host provider) may run virtual tournaments which pits entrants' profiles against each other in a predetermined format, for example, a round robin or a single elimination tournament As a practical matter, these virtual tournaments may be arbitrarily large because they do not suffer the real time constraints of conventional play. Moreover, the vendor can use these tournaments as a method of acquiring demographic data and/or promotional exposure. Tournament results may be posted on a web page, thereby giving entrants an opportunity for bragging rights. Additionally, the winning player may be awarded some prize to encourage participation. In return, the sponsor may require entrants to fill out an entry form or survey of some kind and/or page through web pages of advertisements in order to reach the entry stage. It is envisioned that the exposure value and/or market research value will exceed the cost of sponsoring the tournaments.

Most of the foregoing has assumed that the virual tournaments and the head-to-head competition occurs with only a single individual on a particular side. However, it is also possible that teams of PPs may be pitted against either other teams of PPs or teams of human players. Moreover, this premise can be expanded to a multi-user domain (MUD) gaming scheme which contains elements of game play which occur on the server and elements of game play which occur on a local machine. In such case, the PPs interact with the MUD effecting the virual reality in which play occurs.

Figure 7:
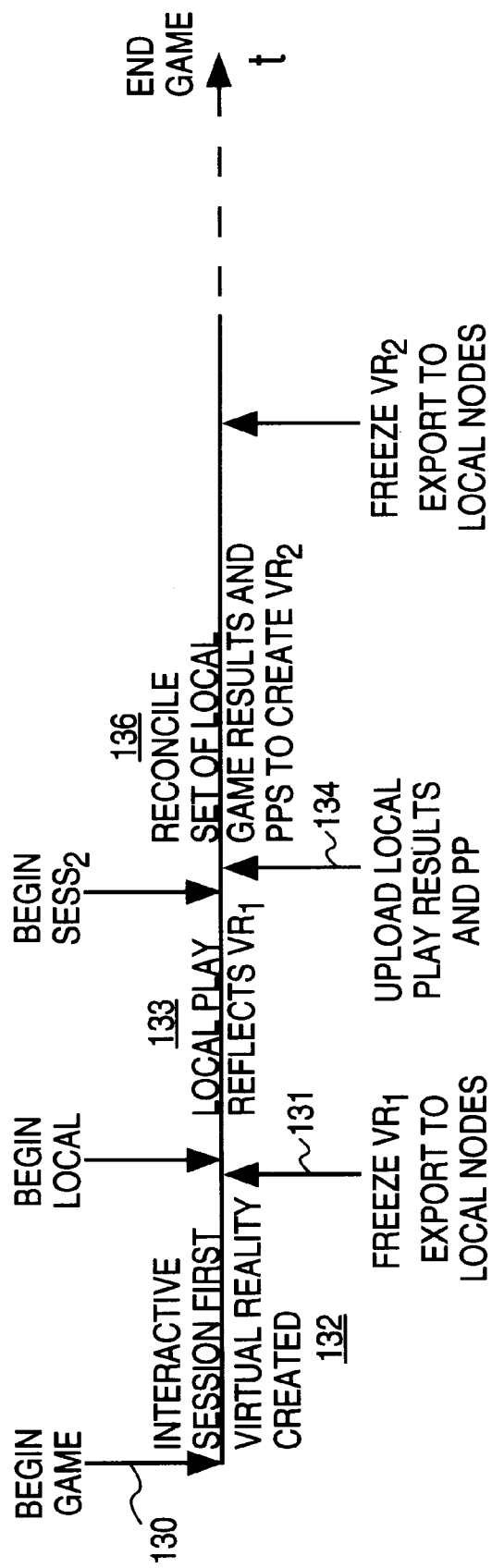
FIG. 7 is a timeline of a cooperative profile gaming experience.

FIG. 7 is a timeline of a cooperative profile gaming experience. At time 130, the game begins and participants interact with virtual space. Teams are formed, and traditional MUD-type activities occur to shape the context of the world which becomes a first virtual reality 132. At time 131, the constraints of the virtual world are frozen and exported to local nodes. Participants engage in computer and graphic intensive play on the local node based on the parameters of the game which reflect a first virtual reality 132. During this play, PPs are generated. At time 134, the PPs from a local game play are uploaded to the server which reconciles the profiles of all the participants to create a second virtual reality 136. Reconciliation could occur as an averaging function, where the PPs of all members of each team are averaged and the outcomes are pitted against each other.

Reconciliation could also occur on an individual basis. For example in a battle game, the PPs of individual combatants could be randomly matched and computationally pitted against the PPs of combatants from another team. After an initial set of battles a certain number of combatants from each side will remain. There could be a second battle between surviving profiles, with the underlying constraints reflecting any advantage a particular team has based on the outcome of the first battle due to numbers of participants. At some point the virtual reality is frozen which reflects the outcome of the battle or battles. The game continues into the indeterminate future periodically reconciling profiles based on local play and downloading new viral realities until a predetermined endpoint is reached.

For example, in a Star Wars digital videodisc (DVD)-based game, a local player could buy a disc and play locally, fight head-to-head, or participate in an on-line MUD where players would register for sessions and be assigned roles via a website. Players would engage in activities based on their role, such as applying a fixed budget to multiple available armaments or fortifications. These activities would shape an initial virtual reality which would be fixed at some point in time, then downloaded to the players' nodes, and then incorporated into the underlying constraints for local game play. Players who have combatant roles would engage in local battles where their performance would be profiled. The profiles would then be uploaded to the server, and computationally pitted against other profiles to determine the state of the next virtual reality. Optional interactive sessions between local game sessions may also contribute to the next virtual reality. It can be seen that this type of play provides a very different experience than the MUD games which currently exist.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:
   tracking data, during computer game play, related to a set of characteristics that compose a player profile of a game; and
   deriving the player profile, including metrics corresponding to the characteristics from at least one game session of the game; and
   using the player profile as a proxy opponent for a first player.

2. The method of claim 1 wherein tracking comprises:
   identifying an inflection point of the game session; and
   retaining data about player response at the inflection point.

3. The method of claim 2 wherein the game has a plurality of inflection points and wherein the step of deriving comprises:
   generating metrics for each characteristic from the data about player response such that a response at each successive inflection point further defines the values of the characteristics included in the player profile.

4. The method of claim 1 wherein deriving further comprising:
   iteratively playing the game with a previous player profile as an opponent; and
   replacing the previous player profile with a new player profile resulting from a game session in which the previous player profile was the opponent.

5. A method comprising:
   tracking data, during computer game play, related to a set of characteristics that compose a player profile of a game;
   deriving the player profile, including metrics corresponding to the characteristics from at least one game session of the game;
   storing a plurality of player profiles of different players; and
   employing at least one of the player profiles to modify default behavior of the game of a first player wherein the employed player profile serves as a proxy opponent in a head-to-head competition.

6. The method of claim 5 wherein a new player profile of the first player is derived from play against the proxy opponent.

7. A method of interactive adaptive game play based on player profiles comprising:
   receiving a role from an interactive host;
   downloading a first virtual reality to a local node;
   conducting play of a game session on the local node during which a player profile is derived; and
   uploading a result of the local play and the derived player profile to the host for reconciliation with results of other local play such that a new virtual reality is created.

8. The method of claim 7 further comprising the step of:
   repeating the steps of downloading, conducting, and uploading an indeterminate number of times until a predetermined end point is reached and wherein a downloaded virtual reality is the new virtual reality of each repetition.

9. The method of claim 8 further comprising interacting with other players on the host between each local play session, the interaction affecting the virtual reality.

10. The method of claim 9 wherein the interactive sessions occur over the Internet.

11. A method of conducting an interactive adaptive game comprising:
    assigning a player a role at a host;
    establishing a virtual reality at the host;
    freezing the virtual reality in a known state, the virtual reality downloadable in the known state;
    receiving results of local play which affect the virtual reality; and
    reconciling the results with the virtual reality to create a new virtual reality.

12. The method of claim 11 wherein player interaction on the host affects the virtual reality until the virtual realty is frozen.

13. A computer readable storage media containing executable computer program instructions which when executed cause a digital processing system to perform a method comprising:
    defining a set of characteristics;
    collecting data during a game session, the data relative to the characteristics and obtained to a granularity such that a player profile modeling game play can be derived therefrom; and using the player profile as a proxy opponent for a player.

14. The computer readable storage media of claim 13 which when executed cause a digital processing system to perform a method further comprising:
    deriving the player profile during a first instantiation of the game; and
    employing the player profile to provide input during a subsequent instantiation of the game.

15. A method comprising:
    tracking data, during computer game play, related to a set of characteristics that compose a player profile of a game; and
    deriving the player profile, including metrics having a predetermined granularity corresponding to the characteristics from at least one game session of the game; and
    using the player profile as a proxy opponent for a first player.

16. A method of adaptive gaming having a plurality of inflection points comprising the steps of:
    tracking data, during computer games play, related to a set of characteristics that compose a player profile of a game wherein the step of tracking data further comprises the steps of identifying an inflection point of the game session and retaining data about player response at the inflection point;
    deriving the player profile, including metrics corresponding to the characteristics from at least one game session of the game wherein the step of deriving the player profile further comprises the step of generating metrics for each characteristic from the data about player response such that a response at each successive inflection point further defines the values of the characteristics included in the player profile; and
    employing the player profile of a first player derived in a prior session to modify a behavior of the game during a subsequent session.

* * * * *

UNITED STATES PATENT AND TRADEMARK OFFICE
CERTIFICATE OF CORRECTION

PATENT NO.     : 6,106,395  
DATED          : August 22, 2000  
INVENTOR(S)    : Begis Page 1 of 1

It is certified that error appears in the above-identified patent and that said Letters Patent is hereby corrected as shown below:

Column 3,
Line 17, delete "characterics" and insert -- characteristics --.
Line 20, after "kept" insert -- . --.
Line 21, delete "poil" and insert -- profile --.
Line 21, delete "characeristics" and insert -- characteristics --.
Line 31, delete "statist" and insert -- statistics --.
Line 64, delete "characteristics" and insert -- characteristic --.

Column 7,
Line 7, after "opponent" insert -- . --.
Line 63, after "tournament" insert -- . --.

Column 8,
Line 9, delete "virual" and insert -- virtual --.
Line 18, delete "virual" and insert -- virtual --.
Line 45, delete "virual" and insert -- virtual --.
Line 52, delete "role" and insert -- roles --.

Signed and Sealed this

Eighteenth Day of December, 2001

*Attest:*

JAMES E. ROGAN
*Attesting Officer*  *Director of the United States Patent and Trademark Office*